Jan. 4, 1966       W. T. HOCHREITER       3,227,058
LIGHT-TIGHT COVER ASSEMBLY FOR FILM MAGAZINE
Filed Aug. 1, 1963                     2 Sheets-Sheet 2
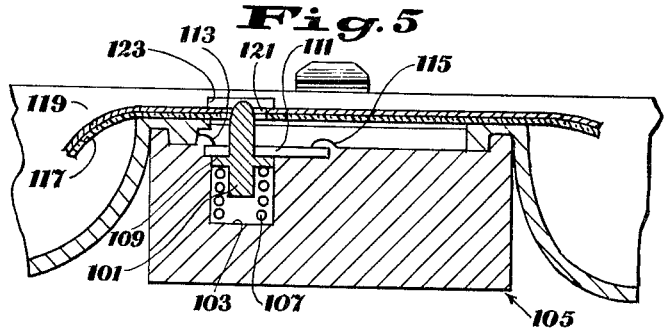
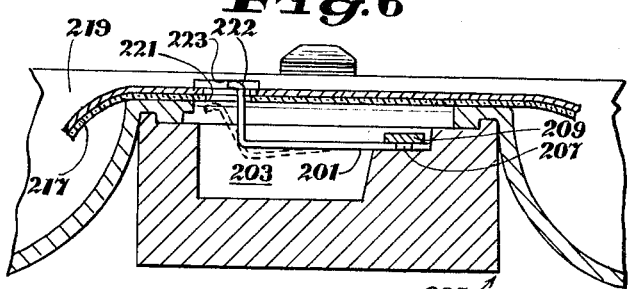
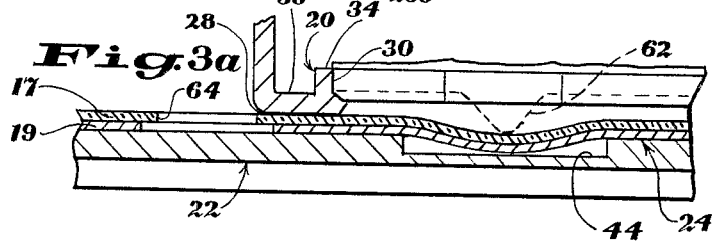
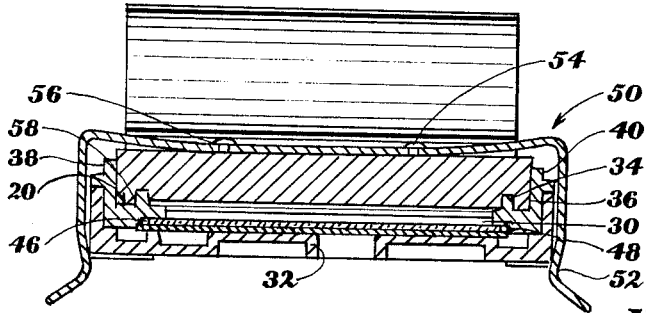
William T. Hochreiter
INVENTOR.
BY R. Frank Smith
Malcolm S. Wenn
ATTORNEYS United States Patent Office 3,227,058
Patented Jan. 4, 1966

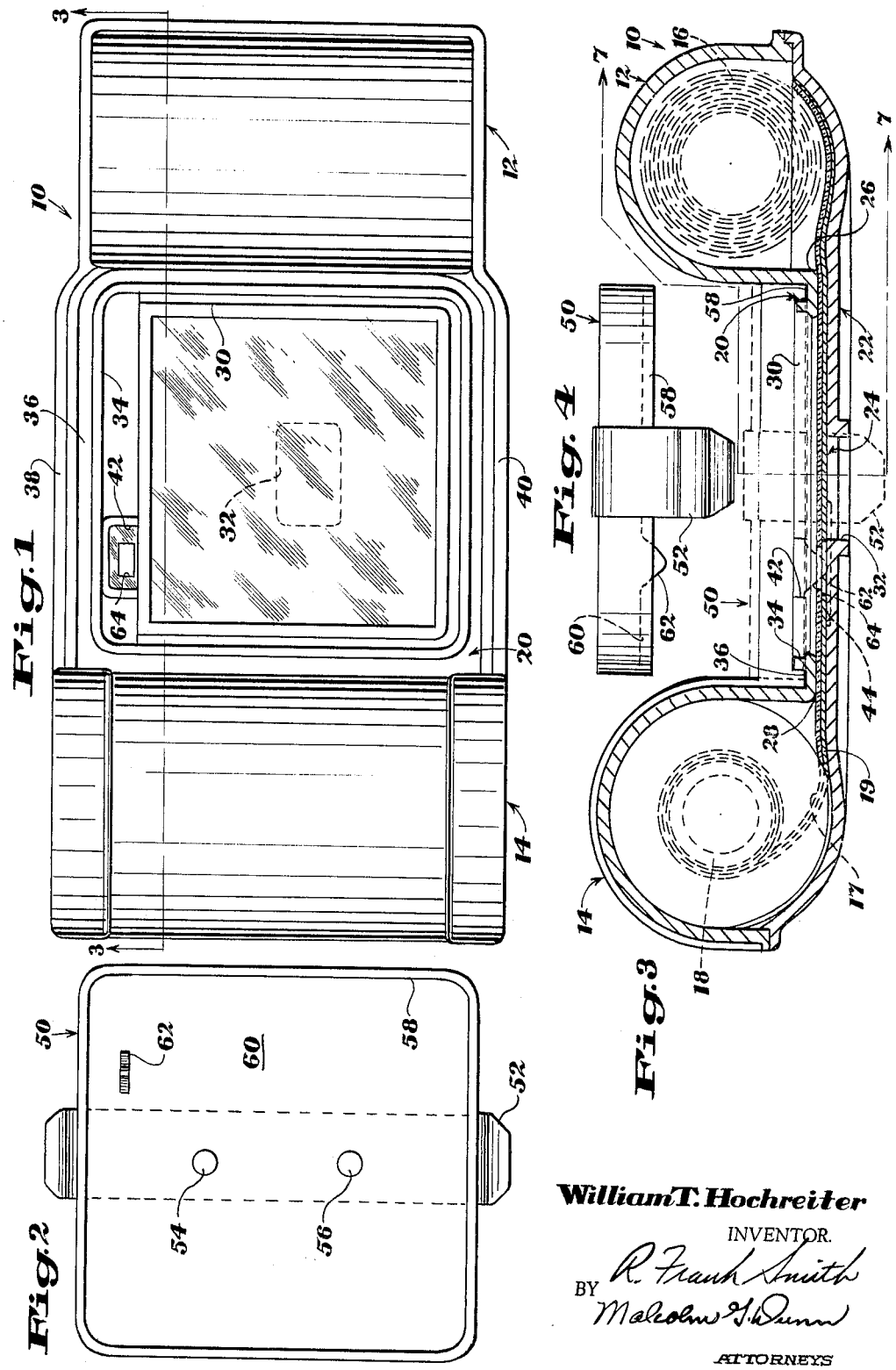

3,227,058
LIGHT-TIGHT COVER ASSEMBLY FOR FILM MAGAZINE
William T. Hochreiter, Rochester, N.Y., assignor to Eastman Kodak Company, Rochester, N.Y., a corporation of New Jersey
Filed Aug. 1, 1963, Ser. No. 299,443
8 Claims. (Cl. 95—34)

The present invention relates to film magazines, and is particularly directed to a light-tight cover assembly for the open exposure apertures of film magazines, such as the magazine which is described in U.S. Patent No. 3,138,081, issued June 23, 1964, in the name of Hubert Nerwin.

In the exemplary magazine construction shown and described in the Nerwin patent, when the film is drawn across the open exposure aperture, the film revealed in the exposure aperture and those portions of the film adjacent to the exposure aperture in the passageways leading into the film supply and film take-up chambers are subject to light fogging if the magazine is not removed from the camera under darkroom conditions.

The reasons for removing the magizine prior to complete use of the film are numerous. It may be desirable to take some pictures with black-and-white film and to take other pictures with color film, or change from one film having a slow A.S.A. film speed index to a film having a faster index. It may also be necessary to have repairs made to the camera.

Once a magazine is removed from the camera for one or more of these reasons, it then becomes necessary to keep the magazine in a darkroom or keep the magazine in a light-tight container until the magazine is to be used again. Obviously, it is inconvenient to leave the magazine in a darkroom. Most camera users do not have darkrooms for such purpose. A light-tight container for such purpose is also inconvenient, bulky and not subject to ease of handling.

One object of the invention, therefore, is to make it easier and more convenient for handling open exposure apertured magazines which have been removed from a camera prior to complete use of the film until a removed magazine is to be reloaded into the camera. This object is accomplished by providing a simply operated cover assembly for clamping over the open exposure aperture to form a light-tight seal with the aperture.

A further problem is presented when the magazine is removed from the camera prior to complete use of the film. While the magazine is in the camera each film frame is accurately maintained in the required position across the open exposure aperture by the camera film metering device. The film metering device preferably includes a pawl which projects into a wall opening of the magazine adjacent to the exposure aperture, passing through a single metering perforation in the film and through a perforation in the light protective supporting web behind the film for receipt within a recess in the magazine wall behind the wall opening. During the time the magazine is removed from the camera, the particular film frame may be subsequently moved from this position because of a clock-springing action in the supply chamber due to rough handling of the magazine or some other reason.

Another object of the invention, therefore, is to provide a means on the cover assembly for arresting movement of the film when the cover assembly is clamped in light-tight sealing relation over the open exposure aperture. This object is accomplished by providing a projecting member on the underside of the cover assembly which engages the film through the wall opening of the magazine to restrain the film against movement.

Other objects inherent in the character of the device described will become apparent to those skilled in the art to which the invention pertains.

In the drawings which form a part of the disclosure of this invention:

FIG. 1 is a plan view of the front side of a magazine or cartridge illustrating the open exposure aperture and the film drawn thereacross with the emulsion side up;

FIG. 2 is a plan view of the bottom side of the magazine or cartridge exposure aperture cover assembly showing the position of the fixed film engaging pawl;

FIG. 3 is a cross sectional view of the magazine or cartridge taken substantially along line 3—3 of FIG. 1 and illustrating in dotted line the position of the cover assembly when covering the exposure aperture;

FIG. 3a is an enlarged fragmentary view similar to FIG. 3 illustrating the position of a film engaging pawl when the perforations in the film and light-protective supporting web have shifted out of alignment with the pawl due to clockspringing of the supply roll or for some other reason;

FIG. 4 is a side elevational view of the magazine or cartridge exposure aperture cover assembly and illustrating with FIG. 3 the relative position of the cover assembly to the magazine or cartridge prior to attaching the same to the magazine in covering relation with the exposure aperture thereof;

FIG. 5 is a fragmentary sectional view of the magazine or cartridge illustrating a sectional view of a modified cover assembly utilizing a resiliently biased film engaging pin;

FIG. 6 is a fragmentary sectional view of the magazine or cartridge illustrating a sectional view of another modified cover assembly utilizing a leaf spring film engaging pawl; and FIG. 7 is a sectional view taken along line 7—7 of FIG. 3 illustrating the position of the clips on the cover assembly relative to the magazine or cartridge when the cover assembly is attached to the magazine in covering relation with the exposure aperture.

*Film magazine or cartridge*

As shown in FIGS. 1 and 3, the film magazine or cartridge 10 comprises a pair of interconnected light-tight chambers 12, 14. Chamber 12 constitutes a film supply receptacle in which a scroll 16 of film 17 and a light-protective supporting web or paper 19 is factory-loaded therein. Chamber 14 constitutes a film take-up receptacle in which a spool 18 is rotatively mounted. The film is attached to the light-protective supporting web by an adhesive paster (not shown) and a leader of the supporting web is suitably connected to the take-up spool 18 by an adhesive strip (not shown).

The two chambers are interconnected by a pair of spaced walls 20, 22 which form a film guide passageway 24 which communicates with the film supply chamber 12 through opening 26 and with the film take-up chamber 14 through opening 28. Wall 20 constitutes the forwardly facing wall as this side of the magazine includes the open exposure aperture 30 which faces forwardly into the camera. Wall 22 constitutes the rearwardly facing wall and preferably includes a viewing window 32 (FIGS. 1, 3, 7) through which the numbers of the particular film frame in exposure position may be read from the back of the light-protective supporting web, as elaborated upon in the Nerwin patent.

The open exposure aperture 30 is bordered by a forwardly projecting continuous rib 34 which extends at right angles from the forward magazine wall 20. The continuous rib 34 is surrounded by a continuous slot 36, the latter being limited in width by the adjacent walls of the pair of chambers, a pair of forwardly projecting side ribs 38, 40 extending at right angles from the forward magazine wall 20 between the chambers, and the continuous rib 34.

A wall opening 42 (FIGS. 1, 3) extends through the forward magazine wall 20 communicating with the film guide passageway 24 and is located adjacent to the exposure aperture inside the area defined by the continuous rib 34 near one corner thereof. It is through this wall opening that the camera film metering mechanism (not shown) extends when the magazine is loaded in the camera for engaging the film perforations in the manner described in the Nerwin patent. Opposite the wall opening and provided within the inside surface of the rear magazine wall 22 is a recess 44 (FIGS. 3, 3a) for receipt of a metering member (not shown).

The magazine is loaded at the factory and the leading end of the light-protective supporting web is extended from the scroll 16 in the film supply chamber 12 through the film guide passageway 24 and into the film take-up chamber 14 for attachment to the film take-up spool 18, as heretofore described. The film is pulled out of the film supply chamber, when the magazine is loaded for use in the camera, by winding up the web leader on the film take-up spool and is aligned for proper take-up on the spool as it passes through the passageway 24 by edge guides 46, 48 (FIG. 7).

The foregoing description does not constitute a part of the invention but only has significance in relation to the invention, which will now be described.

*Cover assembly*

The light-sensitive or emulsion side of the film faces the open exposure opening as the film extends across the exposure opening. Thus if the magazine is removed from the camera while the film is extending across the open exposure aperture, the film in the exposure aperture and those portions of the film in the film guide passageway 24 leading into the chambers are subject to light fogging if the magazine is not removed in a darkened room and stored within a light-tight container.

The cover assembly 50 of the invention eliminates the need for separate light-tight containers by forming a light-tight seal over the open exposure aperture 30 of the film magazine 10. The cover assembly may have a configuration as shown in FIG. 2, and as shown in FIGS. 3 and 4 will nest between the pair of film chambers in overlying relation with the front wall 20 when in use.

The cover assembly 50, which is opaque, includes a spring-clip 52, which may be made of metal or plastic, and suitably secured to the back of the cover assembly, as by rivets 54, 56 (FIG. 2); or if desired, the clip may be formed integrally with the cover assembly (not shown).

A continuously projecting rib 58 extends about the periphery and at right angles to the cover assembly and defines a recess 60, as may be seen in dotted line in FIG. 4. The depth of the recess is determined by the height of the magazine continuously projecting rib relative to the adjacent continuous slot 36. The cover assembly continuous rib 58 engages the outside periphery of the magazine continuous rib 34 to form a light-tight labyrinth therewith, thereby preventing light from entering the open exposure aperture 30 to fog the film.

As shown in dotted line in FIG. 3 and in section in FIG. 7 the spring clip clamps the cover assembly to the magazine by engaging the outsides of the two forwardly projecting side ribs 38, 40 in the manner illustrated.

The particular film frame in position across the open exposure aperture is restrained from inadvertent movement by a protruding member or pawl 62 while the magazine is out of the camera until reloaded. The member shown in FIGS. 2, 4 and in dotted line in FIG. 3 is fixed with respect to the cover assembly and may project through the magazine front wall opening 42 and through the film perforation 64 (FIGS. 1, 3) for receipt within recess 44 behind the wall opening 42, or may bear against the surface of the film (FIG. 3a) if the film frame should shift slightly between the time the magazine is removed from the camera and the time the cover assembly is installed on the magazine.

If the protruding member or pawl 62 bears against the film, the pressing of the film and light-protective supporting web partially into the recess 44, as shown in FIG. 3a, serves to enhance the frictional resistance of the film against movement. In either position, the protruding member engages the film to restrain movement of the film until the magazine is reloaded into the camera.

*Modifications*

A modification of a protruding member is disclosed in FIG. 5 and comprises a pin 101 seated within a recess 103 provided in the cover assembly 105. A coiled spring 107 is also seated within the recess 103 and bears against a collar 109 provided on the pin 101 to urge the pin outwardly of the recess. The pin is retained within the recess by an apertured plate member 111 which passes over the pin in overlying position with respect to the collar 109 and recess 103 and extends beyond the recess for securement to the cover assembly. The plate member 111 may be secured in any suitable manner. As shown in FIG. 5 a portion of the cover assembly is caused to be lapped over the ends of the plate member at 113 and 115.

The spring-urged pin 101 may bear against the film 117 when the cover assembly 105 is in position on the magazine 119, or project through the film perforation 121 for receipt in the wall recess 123.

A further modification of a protruding member is disclosed in FIG. 6 and comprises a leaf spring 201 secured to the cover assembly 205 to one side of a recess 203 over which the major portion of the leaf spring extends. One end of the leaf spring 201 is apertured to fit over a stub projection 207 provided on the cover assembly and is held thereon by a plate member 209, the latter being sealed to the stub projection. The leaf spring, however, may be secured to the cover assembly by any other suitable means.

The leaf spring 201 may bear against the film 217 when the cover assembly 205 is in position on the magazine 219. This position occupied by the leaf spring is shown in dotted lines wherein the spring extends partially into the recess 203 below. The leaf spring may also extend through the film perforation 221 for receipt in the wall recess 223.

*Operation*

In the operation of the invention the magazine or cartridge is removed from the camera in a darkened room and the cover assembly is clamped to the magazine over the exposure aperture so that the rearwardly projecting continuous rib of the cover assembly engages the outside periphery of the forwardly continuously projecting rib of the magazine. The protruding member engages the film by projecting through the film perforations for receipt in the wall recess behind the exposure aperture of the magazine or bearing against the film, as the case may be, to restrain movement of the film until the magazine can be reloaded into the camera.

It will now be apparent that the invention disclosed serves to provide a light-tight seal about the open exposure aperture of a magazine or cartridge so that it may be conveniently carried about under light conditions without light fogging the film.

The invention has been described in detail with particular reference to preferred embodiments thereof, but it will be understood that variations and modifications can be effected within the spirit and scope of the inven-

I claim:

1. A cover assembly for a film magazine of the type for use in a camera wherein the magazine has a pair of spaced walls one of which is provided with an exposure aperture across which the film is drawn for exposure when the magazine is operatively connected to a camera, comprising:
   cover means separate from the magazine for detachable connection thereto in light sealing relation with said exposure aperture when the magazine is removed from the camera to prevent fogging of the film,
   and means extending from said cover means for restraining the film against movement.

2. A cover assembly for a film magazine of the type for use in a camera wherein the magazine has a pair of spaced walls one of which is provided with an exposure aperture and an opening adjacent to said exposure aperture across both of which the film is drawn when the magazine is operatively connected to a camera, comprising:
   cover means separate from the magazine for detachable connection thereto in light sealing relation with said exposure aperture and said wall opening when the magazine is removed from the camera to prevent fogging of the film,
   and means on said cover means for extending through the wall opening for engagement with the film to restrain the film against movement.

3. A cover assembly for a film magazine of the type for us in a camera wherein the magazine has a pair of spaced walls one of which is provided with an exposure aperture and a continuous rib projecting away from and normal to said one wall substantially defining the boundary about said exposure aperture across which the film is drawn when the magazine is operatively connected to a camera, comprising:
   means separate from the magazine for detachable connection thereto and having a continuous peripheral rib for interengagement with the magazine continuous rib to prevent light from entering said exposure aperture when the magazine is removed from the camera to prevent fogging of the film.

4. A cover assembly for a film magazine of the type for use in a camera wherein the magazine has a pair of spaced walls one of which is provided with an exposure aperture and an opening adjacent to said exposure aperture across both of which a film having perforations along one edge thereof is drawn when the magazine is operatively connected to a camera, and the other of said walls is provided with a recess in alignment with said wall opening, comprising:
   cover means separate from the magazine for detachable connection thereto in light sealing relation with said exposure aperture and said wall opening when the magazine is removed from the camera to prevent fogging of the film,
   and means on said cover means for projecting through said wall opening and one of said film perforations for insertion within said recess to restrain the film against movement.

5. A cover assembly for a film magazine of the type for use in a camera wherein the magazine has a pair of spaced walls one of which is provided with an exposure aperture and an opening adjacent to said exposure aperture across both of which a film having perforations along one edge thereof is drawn when the magazine is operatively connected to a camera, and the other of said walls is provided with a recess in alignment with said wall opening, comprising:
   cover means separate from the magazine for detachable connection thereto in light sealing relation with said exposure aperture and said wall opening when the magazine is removed from the camera to prevent fogging of the film,
   and means on said cover means for projecting through said wall opening and bearing against that portion of said film behind said wall opening to press said portion partially into said recess to restrain the film against movement when one of said film perforations is out of alignment with said wall opening and said recess.

6. A cover assembly for a film magazine of the type for use in a camera wherein the magazine has a pair of spaced walls one of which is provided with an exposure aperture and an opening adjacent to said exposure aperture across both of which the film is drawn when the magazine is operatively connected to a camera, comprising:
   cover means separate from the magazine for detachable connection thereto in light sealing relation with said exposure aperture and said wall opening when the magazine is removed from the camera to prevent fogging of the film,
   and means on said cover means for being resiliently urged into engagement with said film through said wall opening for restraining the film against movement.

7. A cover assembly for a film magazine of the type for use in a camera wherein the magazine has a pair of spaced walls one of which is provided with an exposure aperture, a continuous rib projecting away from and normal to said one wall substantially defining the boundary about said exposure aperture, and an opening adjacent to said exposure aperture and within the boundary of said continuous rib, across said exposure opening and said wall opening the film is drawn when the magazine is operatively connected to a camera, comprising:
   cover means separate from the magazine for detachable connection thereto and having a continuous peripheral rib for interengagement with the magazine continuous rib to prevent light from entering said exposure opening and said wall opening,
   and means on said cover means for extending through said wall opening for restraining the film against movement.

8. A cover assembly for a film magazine of the type for use in a camera wherein the magazine has a pair of spaced walls one of which is provided with an exposure aperture, a continuous rib projecting away from and normal to said one wall substantially defining the boundary about said exposure aperture, and an opening adjacent to said exposure aperture and within the boundary of said continuous rib, across said exposure opening and said wall opening the film is drawn when the magazine is operatively connected to a camera, comprising:
   cover means separate from the magazine for detachable connection thereto and having a continuous peripheral rib for interengagement with the magazine continuous rib to prevent light from entering said exposure opening and said wall opening,
   and means on said cover means for being resiliently urged into engagement with said film through said wall opening for restraining the film against movement.

References Cited by the Examiner

UNITED STATES PATENTS

| | | | |
|---|---|---|---|
| 1,510,738 | 10/1924 | Capstaff | 96—119 |
| 1,747,656 | 2/1930 | Ausloos et al. | 96—78 |
| 1,904,097 | 4/1933 | Steiner | 95—34 |

NORTON ANSHER, *Primary Examiner.*

WILLIAM MISIEK, *Examiner.*